(12) United States Patent
Taguchi

(10) Patent No.: US 6,720,951 B2
(45) Date of Patent: Apr. 13, 2004

(54) KEY CUSTOMIZING METHOD AND PORTABLE TERMINAL DEVICE

(75) Inventor: Motoyasu Taguchi, Tokyo (JP)

(73) Assignee: NEC Corporation, Tokyo (JP)

(*) Notice: Subject to any disclaimer, the term of this patent is extended or adjusted under 35 U.S.C. 154(b) by 70 days.

(21) Appl. No.: 09/843,491

(22) Filed: Apr. 26, 2001

(65) Prior Publication Data

US 2001/0048411 A1 Dec. 6, 2001

(30) Foreign Application Priority Data

Apr. 26, 2000 (JP) ........................................ 2000-125123

(51) Int. Cl.⁷ .................................................. G09G 5/00
(52) U.S. Cl. ...................... 345/172; 345/173; 345/104
(58) Field of Search ................................ 345/104, 173, 345/172, 174, 175, 176, 177, 178, 179, 180, 156, 157, 168, 87; 178/18.01, 18.1, 19.01; 341/22, 23

(56) References Cited

U.S. PATENT DOCUMENTS 5,128,672 A * 7/1992 Kaehler .......................... 341/23
5,266,931 A * 11/1993 Tanka ............................ 345/173
6,169,538 B1 * 1/2001 Nowlan et al. ............. 345/168
6,295,052 B1 * 9/2001 Kato et al. ................... 345/179

FOREIGN PATENT DOCUMENTS

| JP | 60-19228 | 1/1985 |
| JP | 63-276116 | 11/1988 |
| JP | 4-134522 | 5/1992 |
| JP | 5-94253 | 4/1993 |
| JP | 10-301692 | 11/1998 |

* cited by examiner

Primary Examiner—Xiao Wu
(74) Attorney, Agent, or Firm—Dickstein, Shapiro, Morin & Oshinsky, LLP.

(57) ABSTRACT

Disclosed is a key customizing method for customizing a plurality of input keys displayed on a liquid crystal display. The method has the steps of: monitoring the turn-on of a key-customize key displayed on the liquid crystal display and, upon the turn-on of the key-customize key, monitoring the selection of at least one input key among the plurality of input keys; when the at least one input key has been selected, displaying, on the liquid crystal display, a key customize pattern for displaying display sites and display sizes of the plurality of input keys; and when a display site and a display size have been input based on the key customize pattern, displaying the at least one input key on the liquid crystal display based on the input display site and display size.

5 Claims, 5 Drawing Sheets

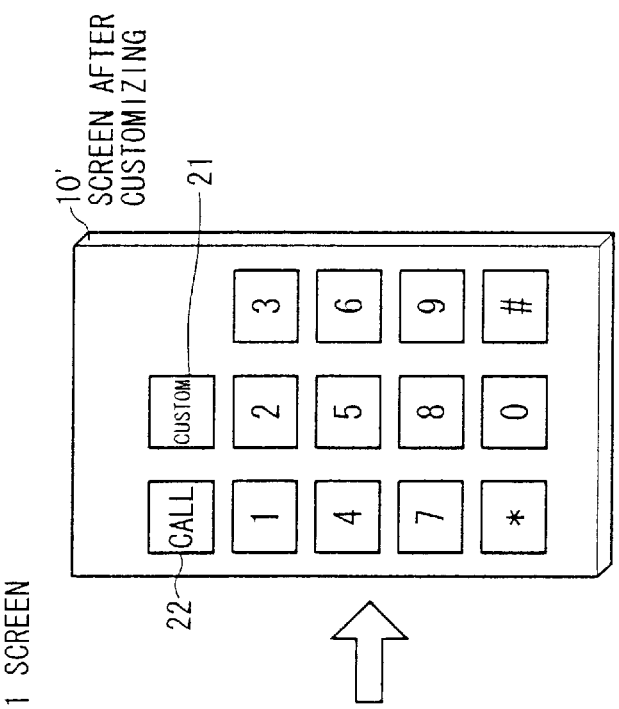
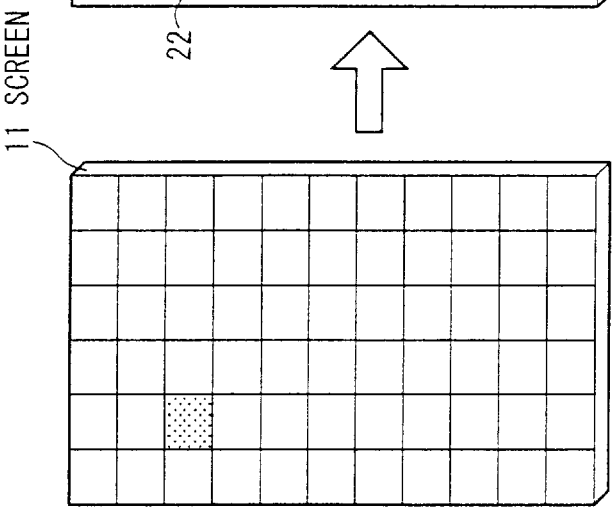
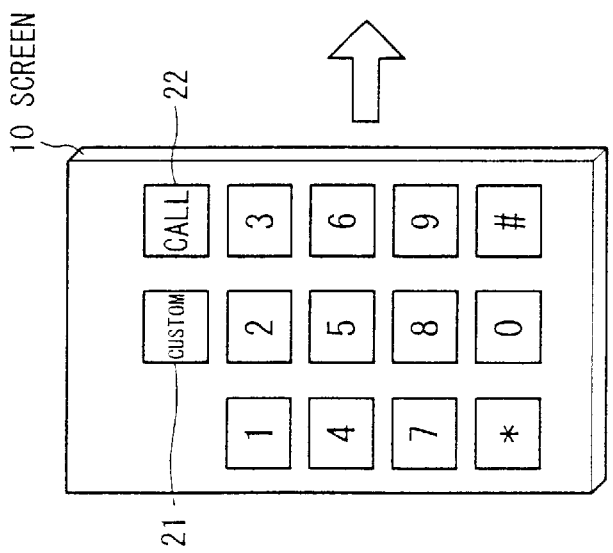

SELECTION OF KEY (CALL) TO BE CHANGED

SELECTION OF SITE TO BE CHANGED

CHANGE TO DESIGNATED SITE

KEY CUSTOMIZING METHOD AND PORTABLE TERMINAL DEVICE

FIELD OF THE INVENTION

The invention relates to a key customizing method and a portable terminal device, and more particularly to a key customizing method and a portable terminal device wherein a liquid crystal display is provided in an input interface circuit and input can be performed by operating keys displayed on the liquid crystal display.

BACKGROUND OF THE INVENTION

The array of keys in an input interface in conventional portable terminal (mobile terminal) devices, such as portable telephones (cellular phones) and PHSS (personal handyphone systems), is fixed to styles according to individual designs of manufactures, and thus has a construction such that, even when a user wishes to change the array of keys, the array of keys cannot be changed.

For example, Japanese Patent Laid-Open No 19228/1985 proposes a key array changing method wherein the array of keys is previously stored in an external storage medium, such as a card, and, in use, the card is connected to a public terminal such as a cash disperser.

Japanese Patent Laid-Open No. 276116/1988 proposes a key array changing method wherein a liquid crystal key is adopted in each key of a keyboard, for example, in a personal computer and the array of keys is changed by changing the display contents of the liquid crystal keys.

Further, Japanese Patent Laid-Open No. 59483/2000 proposes a method wherein a plurality of general purpose keys are provided, the display contents fur each function of a cordless telephone are set in the general-purpose keys, and a different display is arranged in LCD according to a depressed general-purpose key.

The conventional key customizing methods and portable terminal devices, however, have the following drawbacks.

In the method proposed in Japanese Patent Laid Open No. 19228/1985, an external storage medium, such as a card, should be used us means for changing the key array of the terminal and, thus, this method is unsuitable for personal terminal applications such as portable telephones.

In the method proposed in Japanese Patent Laid-Open No. 276116/1988, since a liquid crystal is provided on previously arranged keys, the arrangement can be changed only key by key, and, in addition, the size of the key cannot be changed.

In the method proposed in Japanese Patent Laid-Open No. 59483/2000, the arrangement of keys is unconditionally determined in the general-purpose key, and, thus, the key cannot be moved to a desired site. Further, the size of the display (key) cannot be changed.

SUMMARY OF THE INVENTION

Accordingly, it is an object of the invention to provide a key customizing method and a portable terminal device which permit the display array and display size of keys to be freely changed by users.

In order to attain the above object, according to the first feature of the invention, a key customizing method for customizing a plurality of input keys displayed on a liquid crystal display, comprises the steps of;

monitoring the turn-on of a key-customize key displayed on the liquid crystal display and, upon the turn-on of the key-customize key, monitoring the selection of at least one input key among the plurality of input keys;

when the at least one input key has been selected, displaying, on the liquid crystal display, a key customize pattern for displaying display sites and display sizes of the plurality of input keys; and when a display site and a display size have been input based on the key customize pattern, displaying the at least one input key on the liquid crystal display based on the input display site and display size.

According to this method, as soon as two keys, i.e., the key-customize key and the key, of which the display site or the display size is to be changed, are successively selected, key customize processing is started and the screen on the liquid crystal display is changed from the display of key array to the display of a key customize pattern. Upon the selection of a display size corresponding to a new display site or a new display size of the key to be changed, a new key array is displayed on the screen of the liquid crystal display. Thus, the display array and display size of keys can be freely changed by users, and this contributes to improved convenience.

According to the second feature of the invention, a key customizing method for customizing a plurality of input keys displayed on a liquid crystal display, comprises the steps of:

monitoring the turn-on of a key -customize key displayed on the liquid crystal display and, upon the turn-on of the key-customize key, displaying, on the liquid crystal display, a key customize pattern for displaying display sizes and display sizes of the plurality of input keys;

when a display site and a display size have been input based on the key customize pattern, monitoring the selection of at least one input key among the plurality of input keys; and when the at least one input key has been selected, displaying, on the liquid crystal display, the at least one input key based on the input display site and display size According to this method, upon the depression of the key-customize key, key customize processing is started, and the screen on the liquid crystal display is changed from the display of key array to the display of a key customize pattern. Upon the input of a predetermined site on this display, the screen on the liquid crystal display is returned to the display of key array. Upon keying of a key of which the display site or the display size is to be changed, the screen is changed to the display of key array after movement of the key to a new site or the change of the key size to a new size. Thus, the display array and display size of keys can be freely changed by users, and this contributes to improved convenience.

According to the third feature of the invention, a portable terminal device having a plurality of customizable input keys displayed on a liquid crystal display, comprises:

an input interface circuit which displays a key-customize key in addition to the plurality of input keys on the liquid crystal display and generates a key signal of a turned-on key;

a memory storing a key display pattern, for displaying the plurality of input keys and the key-customize key, and a key customize pattern for customizing the display site and display size of the plurality of input keys; and a control unit which reads the key display pattern from the memory and allows the liquid crystal display to display the plurality of input keys and the key-customize key, wherein the control unit monitors the turn-on of the key-customize key based on the key signal sent from the input interface circuit; upon the turn-on of the key-customize key, monitors the selection of at least one input key among the plurality of input keys; when the at least one input key has been selected, reads from the memory the key customize pattern for displaying the display site and display size of the plurality of input keys and allows the liquid crystal display to display the key customize pattern; and when a display site and a display size have been input into the input interface circuit based on the key customize pattern, allows the liquid crystal display to display the at least one input key based on the key signal according to the input display site and display size.

According to this construction, a plurality of keys are displayed on the liquid crystal display provided in the input interface circuit. When the key-customize key out of the plurality of keys has been input followed by the input of another key, the control unit controls the liquid crystal control circuit so that the liquid crystal display displays the key customize pattern read from the memory. Upon the selection of at least one input key on the pattern display screen, the control unit performs control such that the liquid crystal display displays a key array screen after the movement of the desired key to a new size or the change of the size of the desired key to a new size. By virtue of this, the display array and display size of keys can be freely changed by users, and this contributes to improved convenience.

BRIEF DESCRIPTION OF THE DRAWINGS

The invention will be explained in more detail in conjunction with the appended drawings, wherein:

FIG. 3 is a typical view following a first preferred embodiment of the invention;

DESCRIPTION OF THE PREFERRED EMBODIMENTS

Preferred embodiments of the invention will be explained in conjunction with the accompanying drawings.

Figure 1:
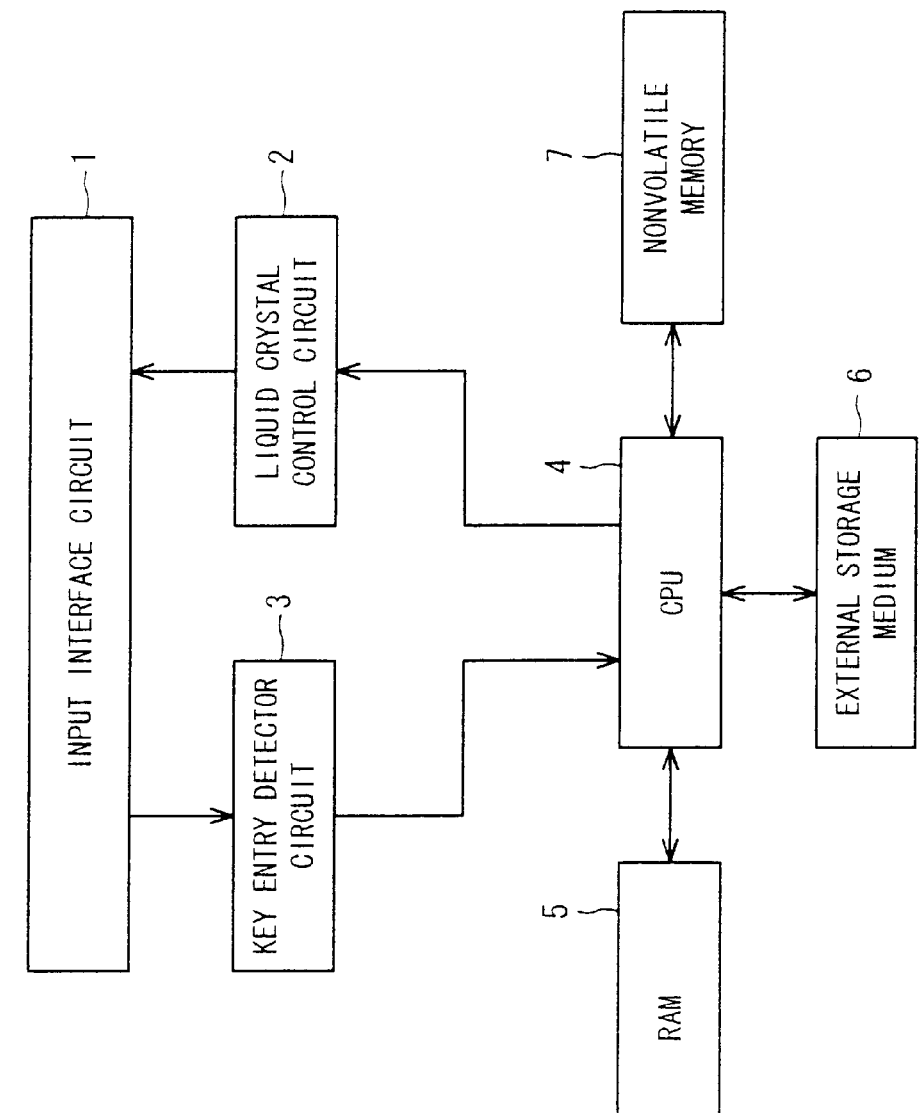
FIG. 1 is a block diagram showing the portable terminal device according to the invention.

FIG. 1 shows the portable terminal device according to the invention

A liquid crystal control circuit 2 and a key entry detector circuit 3 are connected to an input interface circuit 1 incorporating a liquid crystal display (not shown) for displaying a ten key and a function key, CPU 4 as a control unit is connected to the liquid crystal control circuit 2 and the key entry detector circuit 3. RAM 5, an external storage medium 6, and a nonvolatile memory (ROM) 7 are connected to CPU 4.

Figure 2:
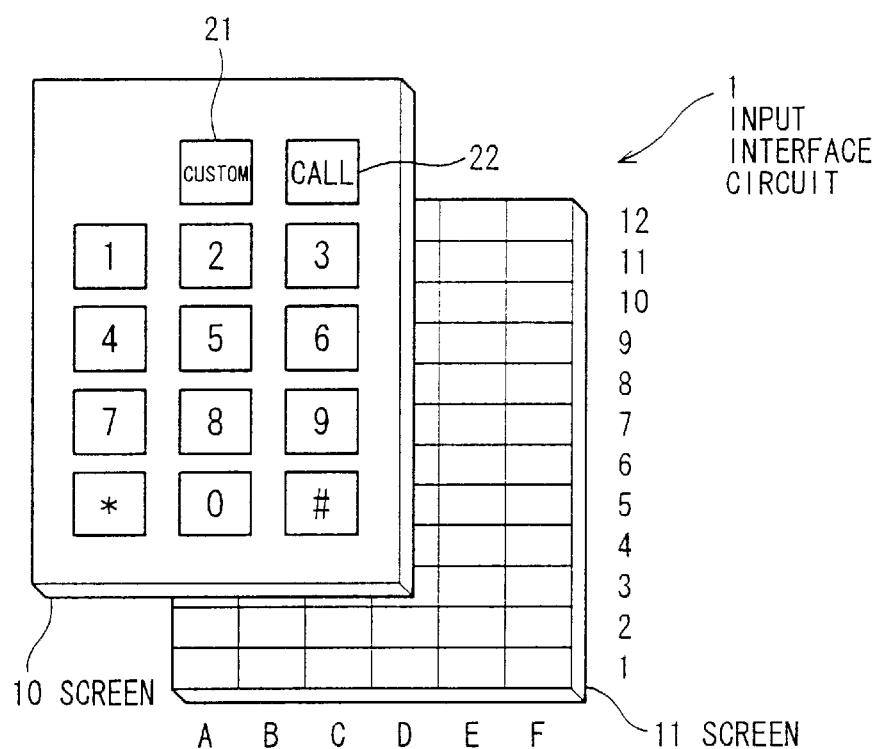
FIG. 2 is a plan view showing the details of a display screen in an input interface circuit.

FIG. 2 shows the detail of the display screen of an input interface circuit 1.

The liquid crystal display of an input interface circuit 1 is provided with a touch-sensitive screen which has been constructed using, for example, an electrically conductive film or a resistive film in a sensor. In the input interface circuit 1, the key array is as shown in FIG. 2, and 14 keys in total (a ten key of "0" to "9", sign keys "+" and "#", "custom" key 21, and "call" key 22) are displayed on the liquid crystal screen. An ordinary display screen is as indicated by 10 in FIG. 2, and upon key customize described below, the screen 10 is changed to a screen 11.

Keying is performed by the touch of a user's finger on the key portion displayed on the liquid crystal screen, or by slight depression of the key portion displayed on the liquid crystal screen. Keying is detected by a key entry detector circuit 3 (not shown) provided on the backside of the input interface circuit 1.

In the screen 11, lines are drawn to form a block check pattern. In this case, the lateral direction of the screen is divided into "A" to "F," and the vertical direction of the screen is divided into "1" to "12." That is, 72 detection regions (divisions) are formed. Thus, the depressed portion on the screen can be detected based on the vertical position and the lateral position. For example, the positional information key "3" can be obtained as "E9," the positional information of key "0" as "C2," and the positional information of key "call" as "E10." As soon as a user depresses the key display portion of the input interface circuit 1, the key entry detector circuit 3 detects the depressed position, and notifies CPU 4 of this information. If the user has depressed key "3," then the key entry detector circuit 3 detects "E9" and notifies CPU 4 of the depression of "E9." 14 keys corresponding to 72 detection regions are set as a table (an associated table) in RAM 5. Comparison of this table with the information from the key entry detector circuit 3 by CPU 4 can determine the input key.

The liquid crystal control circuit 2 performs display control of the input interface circuit 1 in response to a command from CPU 4. An array table of a plurality of keys customized by the user is recorded in the nonvolatile memory 7. Upon the turn-on of the power source and upon the user's instruction, read/write is carried out between the nonvolatile memory 7 and RAM 5 through CPU 4. The table of customized key array is also recorded in the external storage medium 6, and key arrays customized by the user can be displayed on other terminals.

EXAMPLE 1

The procedure of key customizing is shown in FIG. 3.

When changing a key array is contemplated, the "custom" key 21 shown in step (a) of FIG. 3 is first depressed. Next, the "call" key 22, of which the display site is to be moved, is depressed. As a result, CPU 4 recognizes that the user requires the customize or the "call" key 22, followed by a change in liquid crystal display through the liquid crystal control circuit 2. Specifically, the display of keys on the screen 10 disappears, and, as shown in step (b) of FIG. 3, the screen 11 is displayed. Here, in the divisions, a site to which the key is to be changed is selected (in the embodiment shown in FIG. 3, "B10" indicated by the hashed region). This results in the disappearance or the screen 11, and, as shown in step (c) of FIG. 3, a screen 10' after customizing, wherein the "call" key 22 has been moved to above the key "1," appears. With this key customizing, the contents of the table within RAM 5 are updated.

Figure 4:
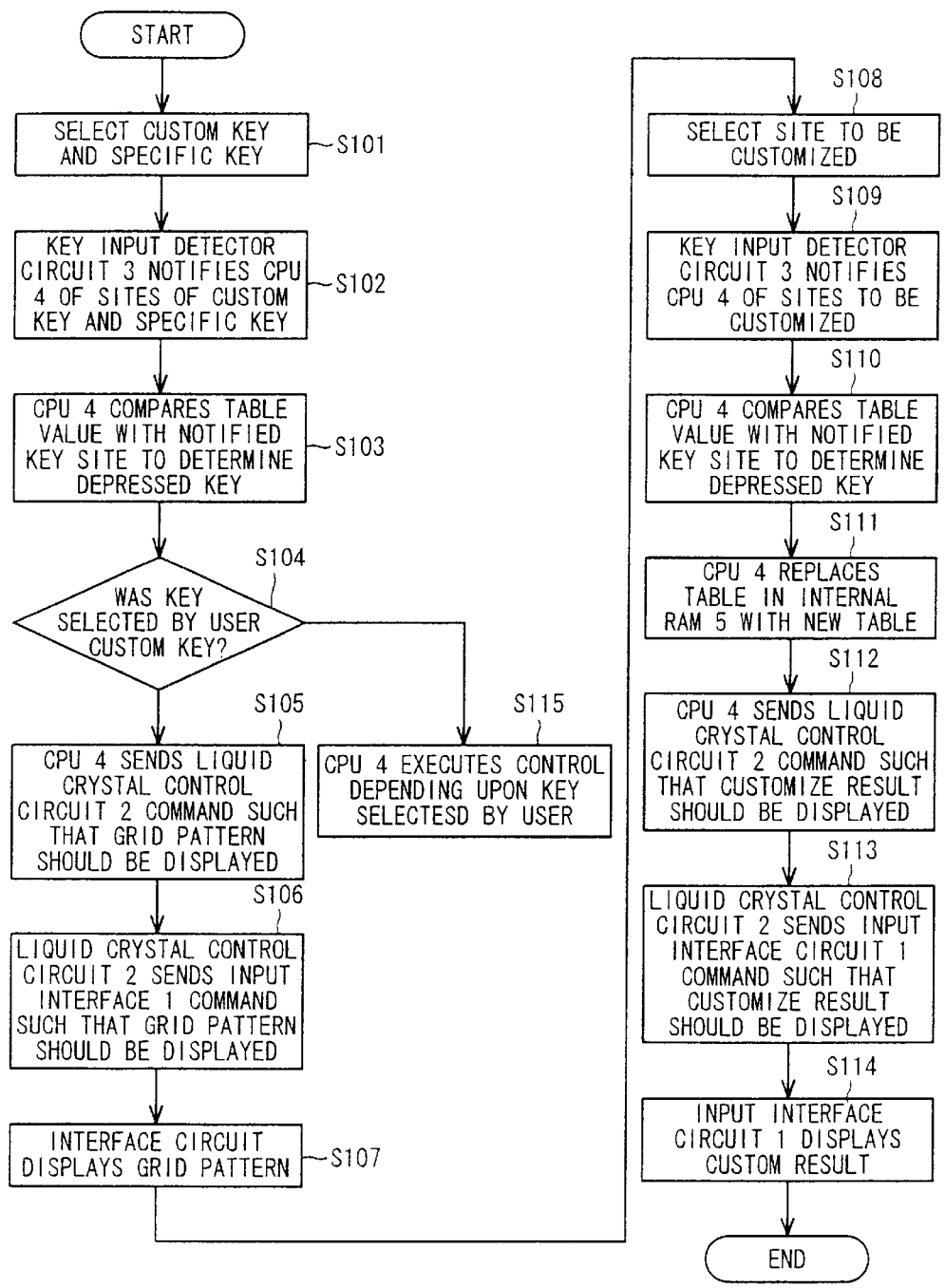
FIG. 4 is a flow chart showing an embodiment of processing in the key customizing method and the portable terminal device according to the invention.

FIG. 4 shows an embodiment of processing in the key customizing method and the portable terminal device according to the invention. In the drawing, "S" represents stop.

The portable terminal device according to the present invention will be explained in conjunction with FIGS. 4 and 1.

When the customize of a key is contemplated, the user selects the "custom" key 21 displayed on the liquid crystal display in the input interface circuit 1, and then selects a specific key (in the embodiment shown in FIG. 3, the "call" key 22) which the user wishes to customize (S101). The key entry detector circuit 3 notifies CPU 4 of the selection of the "custom" key 21 and the specific key ("call" key 22) in the form of information of a combination of alphabets and numerals (S102). CPU 4 compares this information with the key array table recorded in RAM 5 to determine the key selected by the user (S103). As soon as CPU 4 has recognized that the user selected the "custom" key 21 (S104), CPU 4 outputs a command to the liquid crystal control circuit 2 (S105). The liquid crystal control circuit 2 allows the liquid crystal display in the input interface circuit 1 to display a block check pattern (S106) and display shown in step (b) of FIG. 3 is output (S107). On the other hand, when it has been found in S104 that the user depressed a key other than the "custom" key 21, CPU 4 executes control according to the depressed key (S115).

After the user confirms the contents of display shown in step (b) of FIG. 3, he or she selects a destination site, to which the key to be customized ("call" key) is to be moved, in the input interface circuit 1 (S108). The key entry detector circuit 3 notifies CPU 4 of the site to which the key to be customized is to be moved (S109). CPU 4 compares this information with the table in RAM 5 to identify the site to be customized (S110). Further, CPU 4 replaces the table recorded in RAM 5 with the table after customizing specified by the user (S111). CPU 4 controls the liquid crystal control circuit 2 so that the key designated by the user is moved to the site to be customized (S112). The liquid crystal control circuit 2 controls the input interface circuit 1 so that the key designated by the user is displayed at the site to be customized (S113). As a result, as shown in step (c) of FIG. 3, a key array changed by the user's designation is displayed on the liquid crystal screen (S114). This completes the customizing. When the result or judgment in S104 is No. CPU 4 executes control according to the key selected by the user. For example, when a numeral key was depressed, CPU 4 executes the input of the numeral.

EXAMPLE 2

Figure 5A:
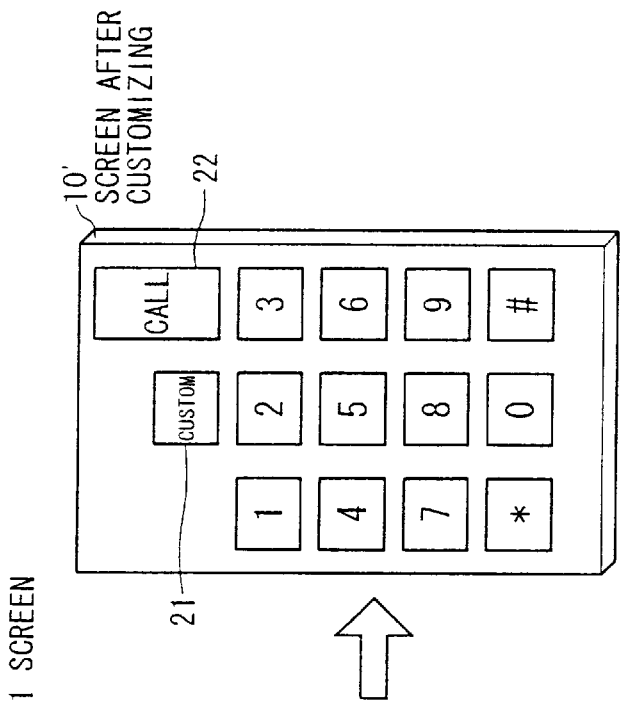
FIG. 5 is a typical view showing a second preferred embodiment of the invention
Figure 5B:
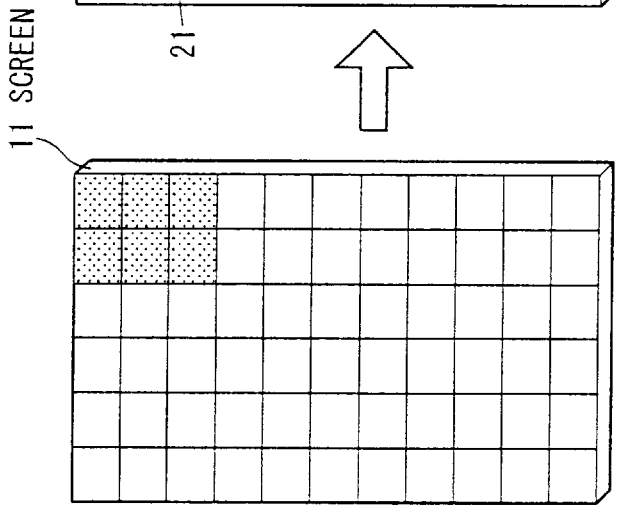
Figure 5C:
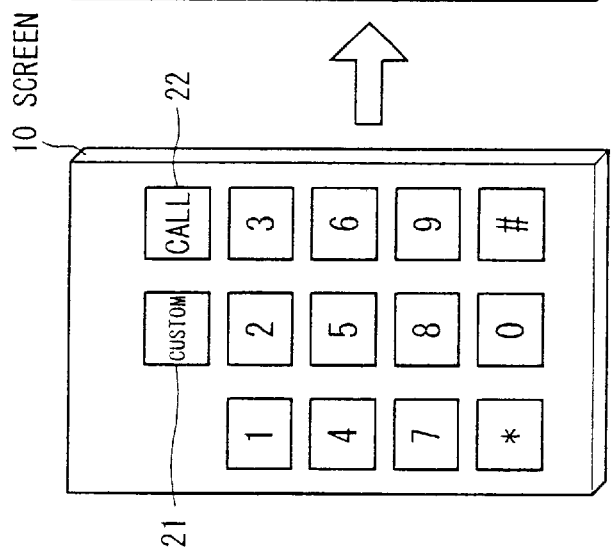

FIG. 5 shows Example 2 of the invention.

This preferred embodiment is characterized in that a plurality of regions out of 72 detection regions on the screen 11 correspond to one key so that the display key size can be enlarged or reduced. As with the embodiment shown in FIG. 3, in Example 2, in such a state that the screen 10 shown in step (a) of FIG. 5 is displayed, the user depresses the "custom" key 21 and the key to be customized (in this embodiment, the "call" key 22). In this case, as with Example 1, the screen 11 of a block check pattern is displayed on the liquid crystal display in the interface circuit 1. At that time, as shown in step (b) in FIG. 5, the user selects a plurality of divisions constituting an area range to which the display size is to be changed. In this selection, the user can select any desired site as well as the key site to he customized. When a change in display size is contemplated, however, a plurality of divisions should be selected. This permits the positional information of all the divisions included in the selected range to be sent to CPU 4. As soon as CPU 4 receives the positional information of the plurality of divisions, CPU 4 controls the liquid crystal control circuit 2 so that the key, which the user wishes to customize, is displayed in a size defined by the designated range. Further, CPU 4 replaces the key array table in RAM 14 with the key array after the customizing. The liquid crystal control circuit 2 controls the input interface circuit 1 so that the key, which the user wishes to customize, is displayed in a size defined by the designated range. As a result, as shown in step (c) of FIG. 5, the key ("call" key 22), which has been enlarged to the size selected by the user, is displayed on the liquid crystal screen. This completes the customizing.

In this example 2, the display size of a key, which the user wishes to customize, can be freely changed by the user by specifying the key area range. The enlargement of the key from the ordinary size has been described in connection with FIG. 5. The enlarged size can be returned to the ordinary size in the same manner as described above.

EXAMPLE 3

This example is such that, when the customize of a key is contemplated, instead of the depression of the "custom" key followed by the depression of a key to be customized, mere depression of the "custom" key can start key customizing. As soon as the "custom" key 21 has been depressed, the screen is changed to a screen as shown in step (b) of FIG. 3. Here a destination division is selected. Upon the completion of this operation, the screen is returned to the screen shown in step (a) of FIG. 3. A key ("call" key 22), which the user wishes to customize, is then depressed. This permits the screen to change to a screen as shown in step (c) of FIG. 3, and a screen 10' after the movement of the "call" key 22 is displayed.

In the above examples, a block check pattern is displayed at th time of key customizing. In the invention, however, the display is not limited to the block check pattern, and, for example, a check pattern or a honeycomb pattern may be adopted. Further, the shape of the divisions of the block check pattern is not limited to square or rectangle, and other polygons, such as rhombus, may be adopted. Further, customizable keys can be limited, and, in this case, only a part of the block check pattern is displayed.

Further, the display content of keys is not limited to the ten key and the "call" key as shown in the drawings, and any content (function) key may be displayed according to applications.

As described above, the key customizing method according to the invention, the selection of two keys, key-customize key and another key, starts key customizing, and the screen on the liquid crystal display is then changed from the display of key array to the display of a key customize pattern. According to the selection of a new display site or a site corresponding to a new display size of the input another key, the input another key is moved, or a key array having a new display size is displayed. Thus, the display array and display size of keys can be freely changed by users, and this contributes to improved convenience.

In the key customizing method according to another aspect of the invention, upon the selection of the key-customize key, the screen on the liquid crystal display is changed from the display of key array to the display of a key customize pattern. Upon the selection of a predetermined site on this display, the screen on the liquid crystal display is returned to the display of key array. Upon keying of a key other than the key-customize key on the key array screen, the screen is changed to the display of key array after the movement of the display site of the key or after the change in display size of the key. Thus, the display array and display size of keys can be freely changed by users, and this contributes to improved convenience.

In the portable terminal device of the invention, a plurality of keys are displayed on the liquid crystal display provided in the input interface circuit. When the key-customize key out of the plurality of keys has been input followed by the input of another key, the control unit controls the liquid crystal control circuit so that the liquid crystal display displays the key customize pattern read from the memory. Upon the selection of at least one input key on the pattern display screen, the control unit performs control such that the liquid crystal display displays a key array screen after the movement of the desired key to a new site or the change of the size of the desired key to a new size. By virtue of this, the display array and display size of keys can he freely changed by users, and this contributes to improved convenience.

The invention has been described in detail with particular reference to preferred embodiments, but it will be understood that variations and modifications can he effected within the scope of the invention as set forth in the appended claims.

What is claimed is:

1. A key customizing method for customizing a plurality of input keys displayed on a liquid crystal display, comprising the steps of:

displaying a key-customize key on the liquid crystal display;

detecting a selection of the key-customize key displayed on the liquid crystal display and, upon the selection of the key-customize key, detecting the selection of at least one input key among the plurality of input keys;

displaying, on the liquid crystal display, a key customize pattern depicting display sites and display sizes of the plurality of input keys;

inputting, based on the key customize pattern, changes to a display site and/or a display size of at least one of the selected input keys; and displaying at least one of the selected input keys on the liquid crystal display based on the inputted changes to the display site and/or the display size.

2. The key customizing method according to claim 1, comprising displaying the key customize pattern as a block check pattern that depicts the display site and the display size of at least one of the selected input keys.

3. The key customizing method according to claim 1, wherein the change to the display site of the selected input key is inputted at a location different from the location of the selected input key, and the change to the display size of the selected input key is inputted at approximately the same location as the selected input key.

4. A portable terminal device having a plurality of customizable input keys displayed on a liquid crystal display, said portable terminal device comprising:

an input interface circuit that displays a key-customize key in addition to the plurality of input keys on the liquid crystal display, and generates a key signal when an input key has been selected;

a memory storing a key display pattern for displaying the display site and the display size of the plurality of input keys and the key-customize key, and a key customize pattern for customizing the display site and display size of the plurality of input keys; and a control unit that reads the key display pattern from the memory and allows the liquid crystal display to display the plurality of input keys and the key-customize key, wherein the control unit:

detects the selection of the key-customize key based on the key signal sent from the input interface circuit;

detects the selection of at least one input key among the plurality of input keys;

reads from the memory the key customize pattern and displays the key customize pattern on the liquid crystal display;

detects an input of a change to the display site and/or the display size at least one of the selected input keys based on the key customize pattern; and causes the liquid crystal display to display at least one of the selected input keys in accordance with the changes inputted to its display site or display size.

5. The portable terminal device according to claim 4, wherein the memory stores, as the key customize pattern, a block check pattern that depicts the display site and/or the display size of at least one of the selected input keys.

* * * * *